(12) United States Patent
Herz

(10) Patent No.: US 8,502,827 B1
(45) Date of Patent: Aug. 6, 2013

(54) SYSTEM, METHOD, AND COMPUTER PROGRAM PRODUCT FOR OUTPUTTING CONTENT DURING A BOOT-UP PERIOD

(75) Inventor: William S. Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1388 days.

(21) Appl. No.: 11/766,936

(22) Filed: Jun. 22, 2007

(51) Int. Cl.
*G06F 15/00* (2006.01)

(52) U.S. Cl.
USPC .......................................... 345/501; 345/611

(58) Field of Classification Search
USPC .................................................. 345/501, 611
See application file for complete search history.

(56) References Cited

U.S. PATENT DOCUMENTS

| | | | |
|---|---|---|---|
| 6,373,498 B1 * | 4/2002 | Abgrall | 345/619 |
| 2005/0172113 A1 * | 8/2005 | Lee | 713/2 |

\* cited by examiner

Primary Examiner — Maurice L McDowell, Jr.
(74) Attorney, Agent, or Firm — Zilka-Kotab, PC

(57) ABSTRACT

A system, method, and computer program product are provided for outputting content during a boot-up period. In use, content is independently processed, utilizing a graphics processor. During a boot-up period, such content is outputted.

26 Claims, 6 Drawing Sheets

SYSTEM, METHOD, AND COMPUTER PROGRAM PRODUCT FOR OUTPUTTING CONTENT DURING A BOOT-UP PERIOD

FIELD OF THE INVENTION

The present invention relates to boot-up sequences, and more particularly to displaying content during a boot-up period.

BACKGROUND

Today, central processor and motherboard manufacturers typically equip their hardware to display bit maps in conjunction with a basic input/output system (BIOS) boot screen, during a boot-up period. However, such bit maps have been limited to static images of a manufacturer's trademark, etc. Further, such bit maps have typically been hard-coded in read-only memory, thus precluding any sort of configurability.

There is thus a need for addressing these and/or other issues associated with the prior art.

A system, method, and computer program product are provided for outputting content during a boot-up period. In use, content is independently processed, utilizing a graphics processor. During a boot-up period, such content is outputted.

DETAILED DESCRIPTION

Figure 1:
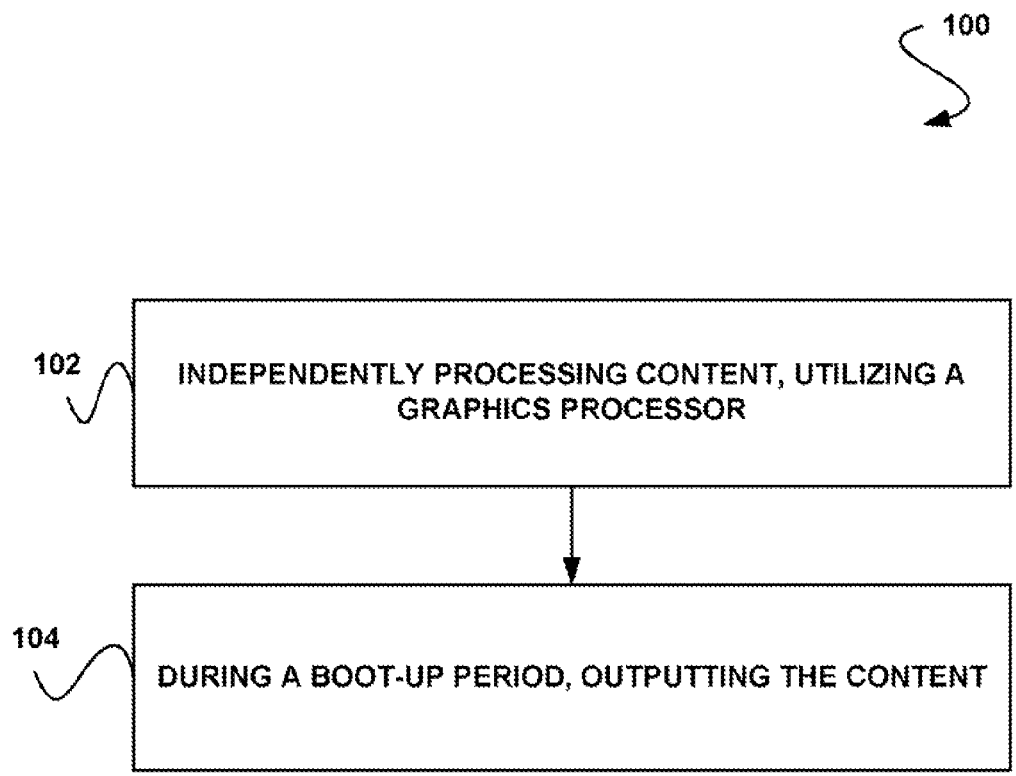
FIG. 1 shows a method for outputting content during a boot-up period, in accordance with one embodiment.

FIG. 1 shows a method 100 for outputting content during a boot-up period, in accordance with one embodiment. As shown in operation 102, content is independently processed, utilizing a graphics processor. In the context of the present embodiment, the graphics processor may include any processor for offloading graphics processing, from another processor (e.g. a central processing unit, etc.). Just by way of example, the graphics processor may optionally include a graphics processing unit (GPU).

In use, the graphics processor may be utilized for controlling content outputted to a display [e.g. such as a display of a computer, mobile phone, personal digital assistant (PDA), etc.]. To this end, the graphics processor may be included with any desired device including, but not limited to the exemplary devices mentioned hereinabove.

Further, the content may include any desired data capable of being independently processed, utilizing the graphics processor. In various embodiments, the content may include any of (or any combination of) video, audio, text, an image (or a series of images, e.g. with two-dimensional or three-dimensional graphics effects), etc. Moreover, the content may take on any desired format (e.g. bit map, jpeg, etc.).

In one optional embodiment, the content may include an advertisement. Such advertisement may include, for example, promotional content associated with a good and/or service. In another embodiment, the content may include information associated with an update for a device. Just by way of example, such device may include the graphics processor, as described above, but, of course, may also include any other desired device or component thereof. Additionally, the update may include an operating system update, an update for an anti-virus scanner, a driver update, and/or any other update that may be utilized by the device. Of course, however, the content may be associated with any desired data.

Still yet, the content may be independently processed in any desired manner that operates independent of a central processing unit (CPU) or any other hardware/software that would otherwise have control of the display of content during a boot-up period. In various embodiments, such independent processing may include, but is certainly not limited to decoding, decompressing, rendering, anti-aliasing, deinterlacing, 2-D or 3-D graphics processing, motion compensation, decrypting, video processing, etc. In one embodiment, the content may be stored in writeable memory [e.g. writeable non-volatile memory, etc.]. For example, the content may be stored in flash memory.

As also shown in operation 104, the content is outputted, during a boot-up period. For example, this may be accomplished by presenting the content (e.g. to a user) via a display, utilizing the graphics processor. In other embodiments, the content may be audible in nature, and may thus be audibly presented.

Furthermore, the boot-up period may include any time period between an off state of the device and a state when resources of the device (e.g. the operating system, etc.) are made available to the user. For example, the boot-up period may include a time period during which a boot sequence is executed. In one embodiment, the boot-up period may include a basic input/output system (BIOS) boot-up period. Such BIOS boot-up period may include, for example, a period of time in which a boot sequence for the BIOS is executed (e.g. via, read-only memory). To this end, the BIOS boot-up period may include a period of time before an operating system is loaded.

In another embodiment, the boot-up period may include an operating system boot-up period. In one embodiment, the operating system boot-up period may include a period of time in which a boot sequence for the operating system is executed (e.g. for loading the operating system, etc.). Of course, it should be noted that the content may be outputted, not only during the boot-up period, but also during a period of time after the boot-up period, as an option. As another option, the content may be outputted during only a portion of the boot-up period.

In this way, content that is processed utilizing a graphics processor may be outputted during a boot-up period. Thus, the content outputted during the boot-up period may not necessarily be limited to static content identified via the BIOS. Moreover, processing the content utilizing the graphics processor may enable the boot-up period to be executed (e.g. by a central processing unit, etc.) uninterrupted.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
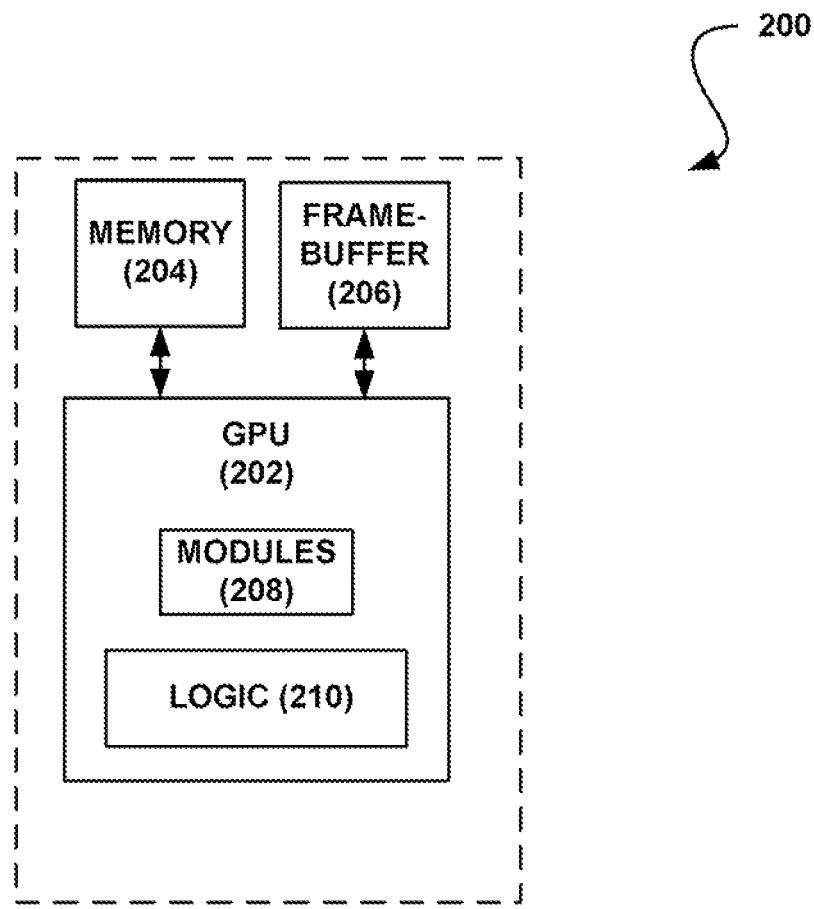
FIG. 2 shows a system for outputting content during a boot-up period, in accordance with another embodiment.

FIG. 2 shows a system 200 for outputting content during a boot-up period, in accordance with another embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 includes a graphics processing unit (GPU) 202 that is in communication with memory 204 that is used to store content. The system 200 may include a graphics card, in one embodiment. For example, the memory 204 may include writeable memory, such that content stored therein may be overwritten.

In addition, the GPU 202 may include a plurality of modules 208 that are each capable of processing the content identified in the memory 204 in a variety of ways. In one embodiment, the modules 208 may include a shader module that can be utilized for rendering aspects of the content identified in the memory 204. In addition, the shader module may perform anti-aliasing, deinterlacing and/or other functions on the identified content. In another embodiment, the modules 208 may include a general computation module for performing general computations (e.g. arithmetic, programming one of the foregoing shader modules, etc.). Moreover, the modules 208 may include a video processor module for processing content that includes video.

In still additional embodiments, the modules 208 may include a multi-standard decoder. The multi-standard decoder may be utilized by the GPU 202 for decoding the content identified in the memory 204. In this way, such multi-standard decoder may be utilized for decoding content in a variety formats. As an option, the multi-standard decoder may include a self-contained decoder.

The modules 208 may also include an inverse discrete cosine transform (IDCT) module. Such IDCT module may be utilized for frequency domain decompression of the content identified in the memory 204, for example. Still yet, the modules 208 may include a motion compensation module. In use, the motion compensation module may be utilized in association with any deinterlacing performed by the above described shader modules. Of course, it should be noted that, while various examples of the modules 208 have been described herein, any combination of such modules 208 and/or any other modules may also be included with the GPU 202, for the purpose of supporting any necessary processing of the content, etc.

The GPU 202 also includes hard-coded logic 210 that exists on the GPU 202 prior to loading a device operating system on which the system 200 is located. Such logic 210 may be utilized for identifying the content in the memory 204, and controlling necessary graphics and/or video processing for outputting the content to a display, independent of other resources (e.g. a central processor unit, etc.). While not shown, the GPU 202 may also include a video BIOS (VMS) (e.g. stored in firmware of the GPU 202, etc.). The VBIOS includes instructions for supporting the decoding, decryption, rendering, and display of the content identified in the memory 204. In one embodiment, the GPU 202 may be allowed to process content in various different formats, based on the VBIOS.

As also shown, the GPU 202 is in communication with a frame buffer 206. The frame buffer 206 may be utilized to feed the GPU 202 for driving a display (not shown associated with the GPU 202. In one embodiment, a memory arbiter module may be included with the modules 208 of the GPU 202 for interfacing the frame buffer 206 with the GPU 202.

While not shown, a system BIOS may remain in communication with the GPU 202 via a bus. In one embodiment, the BIOS may be located on a motherboard. In another embodiment, the bus may include a peripheral component interconnect express (PCIE) bus. To this end, the GPU 202 may be capable of independently processing content stored in the memory 204, and optionally outputting such content via a display, as a function of operations and/or signals associated with the system BIOS (as will soon become apparent).

Figure 3:
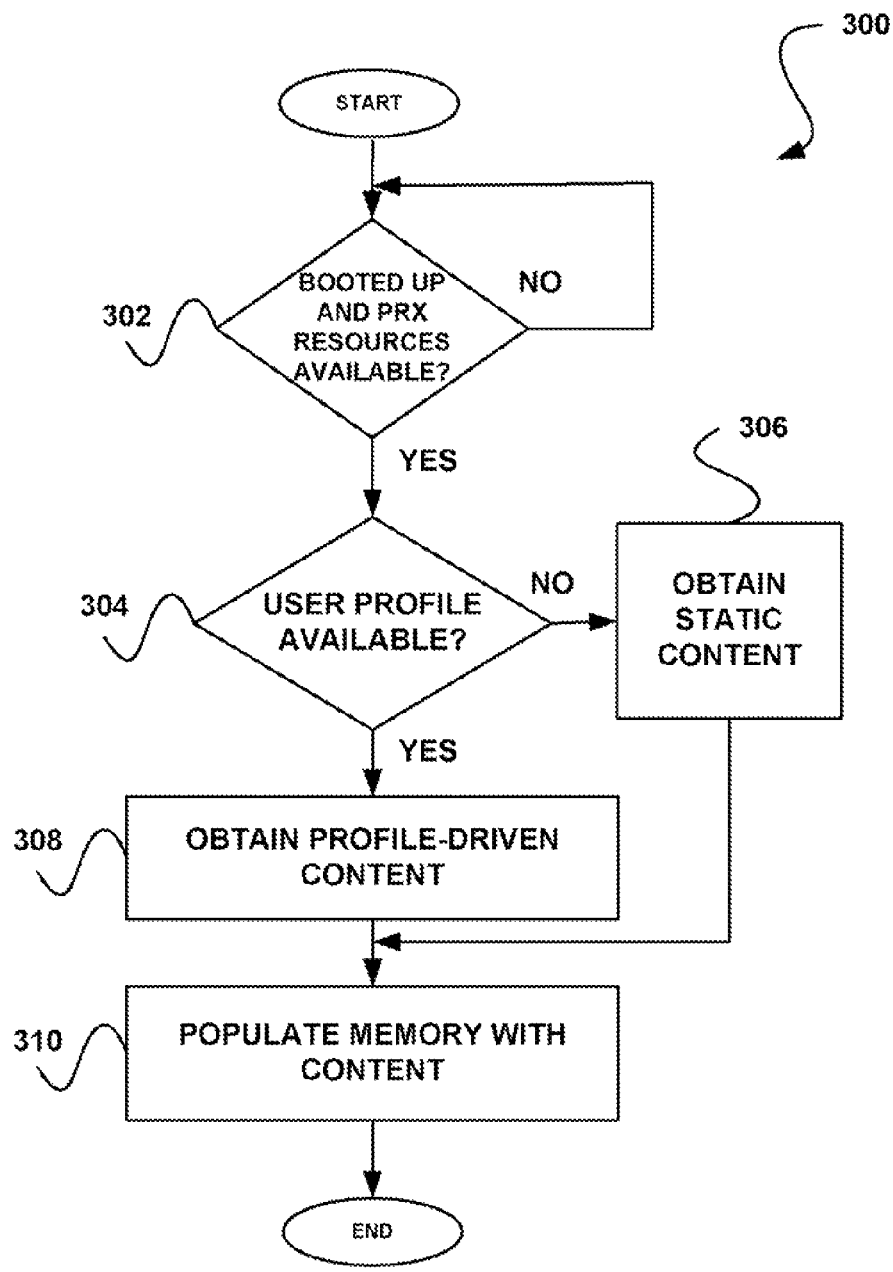
FIG. 3 shows a method for dynamically populating memory with content, in accordance with yet another embodiment.

FIG. 3 shows a method 300 for dynamically populating memory with content, in accordance with yet another embodiment. As an option, the present method 300 may be carried out in the context of the functionality and architecture of FIGS. 1-2. Of course, however, the method 300 may be carried out in any desired environment. It should also be noted that the aforementioned definitions may apply during the present description.

As shown in decision 302, it is determined whether a device has been booted up and whether processing resources are available. In one embodiment, the device may be determined to be booted up when an operating system of the device has been loaded. Further, processing resources may be determined to be available when a predetermined threshold of processing resources are available, in one embodiment. For example, processing resources may be determined to be available if the device is capable of obtaining and processing content without interfering with other processing tasks that are being performed.

Once it is determined that the device has been booted up and that processing resources are available, it is determined whether a user profile is available. Note decision 304. The user profile may include any data capable of being associated with a user of the device a user who has logged onto the device, an owner of the device, etc.).

In some embodiments, the user profile may include information describing the device (and/or any applications installed thereon), a location of the device, a demographic of the user, preferences of the user, purchase activity of the user (e.g. with respect to purchases performed over a network, such as the Internet), network locations (e.g. web sites) visited by the user, etc. To this end, the data stored in the user profile may be automatically generated (e.g. via user interactions with various types of content over the network) or manually generated (e.g. based on information manually entered/selected by the user).

In one embodiment, the user profile may be stored on the device. For example, an application on the device may be utilized for identifying the data included in the user profile. Accordingly, determining whether the user profile is available, in such embodiment, may include determining whether the user profile is populated with data.

In another embodiment, the user profile may be stored on a computer (e.g. server remotely located over a network with respect to the device. For example, the user profile may be stored in a database of user profiles, where the user profiles are associated with different devices. In such embodiment, determining whether the user profile is available may include determining whether the remotely stored user profile is capable of being accessed via the network.

If it is determined that the user profile is not available, static content is obtained, as shown in operation 306. In the context of the present embodiment, the static content may include various predetermined content. For example, the static content may be obtained irrespective of data in any user profile. In various embodiments, the static content may be obtained locally or over the network (e.g. by being downloaded, pushed, etc. to the device).

If, however, it is determined that the user profile is available, profile-driven content is obtained, as shown in operation 308. For example, the profile-driven content may be obtained (e.g. downloaded, pushed, etc. to the device) by identifying and accessing content based on the user profile. In various embodiments, the profile-driven content may be obtained locally or over the network (e.g. by being downloaded, pushed, etc to the device).

For instance, the profile-driven content may be obtained from a content server located on the network. In such embodiment, such content server may store content that is mapped with various data capable of being included in the user profile. Accordingly, a query may be performed on the database for obtaining content associated with the data included in the user profile. As another option, the profile-driven content may be obtained locally from the device. For example, the user profile may indicate a location of content (e.g. digital photos, video, etc.) stored on the device, where such location is optionally specified by the user.

In one embodiment, the profile-driven content may include advertising content associated with goods and/or services purchased or perused by the user over the network. In another embodiment, the profile-driven content may include advertising content associated with network sites visited by the user. As an option, benefits (e.g. payment, coupons, etc.) may be provided to the user in conjunction with such advertisements. As a further option, advertisers may even be required to pay for the ability to provide their advertising content, based on the user profile, etc.

In yet another embodiment, the profile-driven content may include information describing an available update associated with the device and/or applications installed thereon. In still yet other embodiments, the profile-driven content may include weather information, alerts, and/or any other content capable of being associated with data in the user profile. In this way, the content may be user-targeted. Of course, as another option, the profile-driven content may be obtained in addition to static content.

In one example of use, the profile-driven content may be obtained utilizing an application that automatically obtains content over the network based on network sites visited by the user. For example, the application may track network sites visited by the user, and may obtain content from such network sites. In another example of use, the profile-driven content may be manually obtained by the user. For instance, the user may select (e.g. purchase, etc.) specific content, such that the specific content is obtained in response to the selection.

In any case, memory is populated with the obtained content, as shown in operation 310. For example, such memory may include writable memory capable of being accessed by a graphics processor. Thus, the content may optionally be received via a network before being written to the writeable memory. As an option, the obtained content may be decoded, decompressed, etc. prior to populating the memory.

Thus, the content may be written to the writable memory during an active session when the device has been booted up and processing resources are available, prior to a subsequent boot-up period. As an option, the content may be obtained and the memory may be populated with such content, as a background task. To this end, the content may be pre-loaded in memory during the active session, such that it may be accessible during the next boot-up period of the device, as will soon become apparent.

Figure 4:
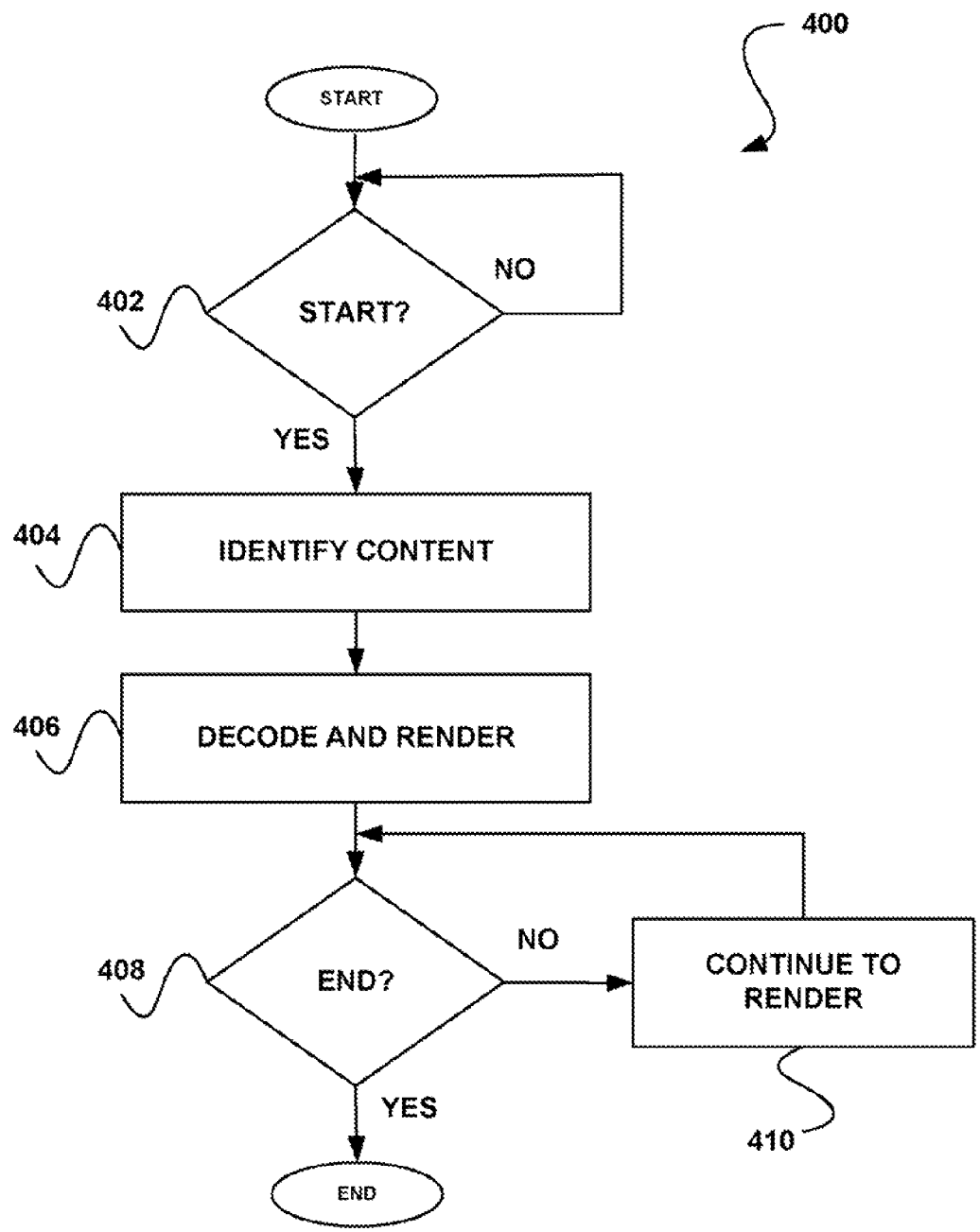
FIG. 4 shows a method for rendering content during a boot-up period, in accordance with still yet another embodiment.

FIG. 4 shows a method 400 for rendering content during a boot-up period, in accordance with still yet another embodiment. As an option, the present method 400 may be carried out in the context of the functionality and architecture of FIGS. 1-3. Of course, however, the method 400 may be carried out in any desired environment. It should also be noted that the aforementioned definitions may apply during the present description.

As shown in decision 402, it is determined whether a start condition has been identified. In the context of the present embodiment, the start condition may include any condition capable of being identified in a device that is associated with a boot-up of the device.

In one embodiment, the start condition may include a signal indicative of a hoot-up period. For example, the start condition may include a signal indicating execution of a first operation (or any other particular operation) in a boot-up sequence (e.g. a BIOS boot-up sequence, an operating system boot-up sequence, etc.). As another example, the start condition may include a signal indicating an active power-up state of the device, in another embodiment, the start condition may be based on an elapsed time period (e.g. after receipt of the signal indicative of the boot-up period), in various additional embodiments, the start condition may be manually configured (e.g. by configuring the foregoing elapsed time period).

In still yet another embodiment, the start condition may be based on receipt of static content that a central processing unit or other hardware has directed to be output via a graphics processor. For example, the start condition may be identified, in response to a command by the central processing unit to output static content. In this way, the start condition may allow for interception of such static content utilizing the graphics processor, for the purpose of displaying different and/or additional content under the direction of the graphics processor.

In response to a determination that the start condition has been identified, content is identified, as shown operation 404. In one embodiment, the content may be identified in memory capable of being accessed by the graphics processor. In addition, the content may include profile-driven content or static content (e.g. such as that described in operations 306 and 308 of FIG. 3). In this way, the content may be identified during the boot-up period.

Further, the content is decoded and rendered to a display, as shown in operation 406. It should be noted that the content may only be decoded if the identified content is encoded. As another option, the content may be decompressed by the graphics processor, if the identified content is compressed. Accordingly, the content may be processed and outputted during a boot-up period of the device utilizing the graphics processor. Further, this may be accomplished such that the boot-up sequence under the direction of the central processing unit may remain uninterrupted (with the exception of the display of different and/or additional content by the graphics processor).

As also shown, it is determined whether an end condition has been identified, as shown in decision 408. In various embodiments, the end condition may be interrupt-driven for accomplishing the various functionality set forth herein. For example, in one embodiment, the end condition may indicate an end of the boot-up period. For example, the end condition may include a signal indicating execution of a last operation in a boot-up sequence.

In another embodiment, the end condition may be based on a predetermined time period. Thus, the end condition may be identified in response to a cessation of the predetermined time period. In one embodiment, the end condition may be manually configured (e.g. by configuring the predetermined time period).

In yet another embodiment, the end condition may be based on a conclusion of the content. For example, the end condition may be identified in response to the conclusion of video, audio, a sequence of images, etc in still yet another embodiment, the end condition may be based on receipt of a command by the central processing unit to cease outputting static content, etc. (which was replaced by different and/or separate content). Of course, it should be noted that the end condition may include any desired condition capable of being identified.

In response to a determination that the end condition has been identified, rendering of the content is terminated. Thus, rendering of the content may be performed continuously (see operation 410) until it is determined that the end condition has been identified. To this end, the content may be displayed for a predetermined amount of time, during an entire boot-up period of the device, etc.

As an option, once the rendering of the content is terminated, the graphics processor may again render content indicated by the central processing unit or other hardware. Just by way of example, the graphics processor may render static content associated with any remaining portion of the boot-up period, static and/or dynamic content associated with a loading/loaded operating system, etc. In this way, the graphics processor may utilize context switching, such that the content processed by the graphics processor may be output during the boot-up period, and content specified by a loading/loaded operating system may be output thereafter, for example. It should be noted that such context switching may be provided as an opt-in feature, such that a user may specify whether the obtained content is to be output during the hoot-up period, but of course may also be provided automatically in other embodiments.

Figure 5:
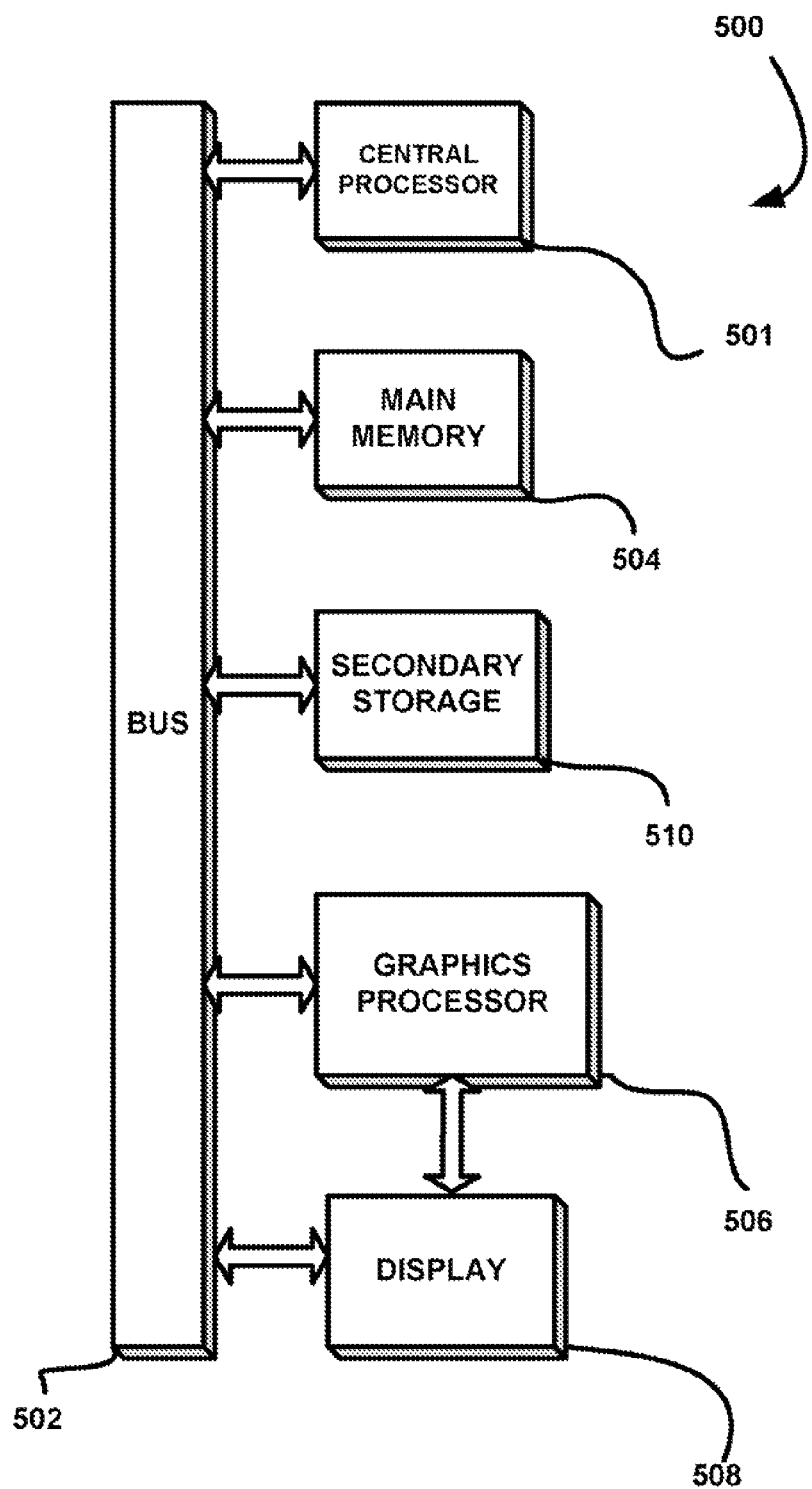
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices m including, but not limited to a personal digital assistant (PDA) device, a mobile phone device, a television, etc.

Further, while not shown, the system 500 may be coupled to a network. [e.g. a telecommunications network, local area network (LAN), wireless network, wide area network (WAN) such as the Internet, peer-to-peer network, cable network, etc.) for communication purposes. See FIG. 6, for example.

Figure 6:
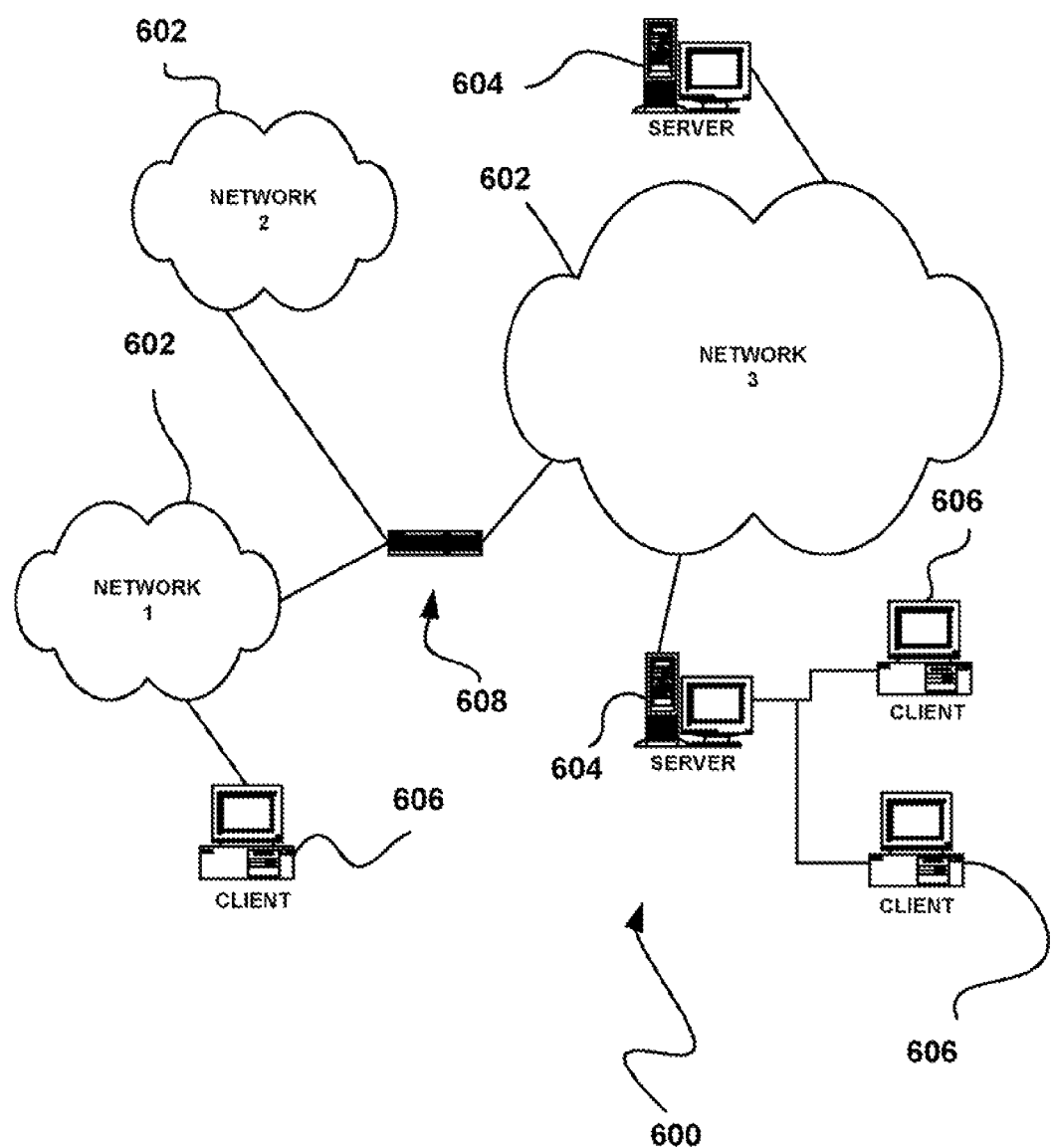
FIG. 6 illustrates a network architecture, in accordance with another embodiment.

FIG. 6 illustrates a network architecture 600, in accordance with another embodiment. As shown, a plurality of networks 602 is provided. In the context of the present network architecture 600, the networks 602 may each take any form including, but not limited to a local area network (LAN), a wireless network, a wide area network (WAN) such as the Internet, peer-to-peer network, etc.

Coupled to the networks 602 are servers 604 which are capable of communicating over the networks 602. Also coupled to the networks 602 and the servers 604 is a plurality of clients 606. Such servers 604 and/or clients 606 may each include a desktop computer, lap-top computer, hand-held computer, mobile phone, personal digital assistant (PDA), peripheral (e.g. printer, etc.), any component of a computer, and/or any other type of logic. In one embodiment, one or more of the clients 606 may include the system 500 of FIG. 5, for example. In order to facilitate communication among the networks 602, at least one gateway 608 is optionally coupled therebetween.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining whether a remotely stored user profile is available and accessible via a network, and in response to the determination, obtaining content that includes static content if the remotely stored user profile is not available, and obtaining the content that includes profile-driven content if the remotely stored user profile is available;

independently processing the content, utilizing a graphics processor; and during a boot-up period, outputting the content.

2. The method of claim 1, wherein the content includes video.

3. The method of claim 1, wherein the content includes audio.

4. The method of claim 1, wherein independent processing includes at least one of decoding, decompressing, rendering, anti-aliasing, deinterlacing, graphics processing, motion compensation, decryption, and video processing.

5. The method of claim 1, wherein the content includes an advertisement.

6. The method of claim 1, wherein the content includes information associated with an update for a device.

7. The method of claim 1, wherein the content is stored in writeable memory.

8. The method of claim 7, wherein the content is written to the writeable memory prior to the boot-up period during a previous active session.

9. The method of claim 7, wherein the content is received via the network before being written to the writeable memory.

10. The method of claim 1, wherein the profile-driven content is selected based on the remotely stored user profile.

11. The method of claim 10, wherein the remotely stored user profile includes information describing network sites visited by a user.

12. The method of claim 10, wherein the remotely stored user profile includes information describing a device of a user.

13. The method of claim 1, and further comprising identifying a signal indicative of the boot-up period.

14. The method of claim 13, wherein the content is outputted in response to the signal.

15. The method of claim 1, wherein the content is displayed for a predetermined amount of time.

16. The method of claim 1, wherein the boot-up period includes a basic input/output system boot-up period.

17. The method of claim 1, wherein the boot-up period includes an operating system boot-up period.

18. The method of claim 1, wherein the content is identified in response to a determination that a start condition has been identified.

19. The method of claim 18, wherein the start condition is identified in response to a command by a central processing unit to output the static content.

20. The method of claim 18, wherein the start condition allows for the obtaining of the static content utilizing the graphics processor, for the purpose of displaying at least one of different content than and additional content to the static content under the direction of the graphics processor.

21. The method of claim 1, wherein the static content includes predetermined content that is downloaded over the network to the graphics processor.

22. The method of claim 1, wherein the profile-driven content is obtained utilizing an application that tracks network sites visited by a user and automatically obtains the content over the network based on the network sites visited by the user.

23. The method of claim 22, wherein the content that is automatically obtained by the application based on the network sites visited by the user is obtained from the network sites.

24. A computer program product embodied on a non-transitory computer readable medium, comprising:

computer code for determining whether a remotely stored user profile is available and accessible via a network, and in response to the determination, obtaining content that includes static content if the remotely stored user profile is not available, and obtaining the content that includes profile-driven content if the remotely stored user profile is available;

computer code for independently processing the content, utilizing a graphics processor; and computer code for outputting the content, during a boot-up period.

25. An apparatus, comprising:

a graphics processor for determining whether a remotely stored user profile is available and accessible via a network, in response to the determination, obtaining content that includes static content if the remotely stored user profile is not available and obtaining the content that includes profile-driven content if the remotely stored user profile is available, and outputting the content during a boot-up period.

26. The apparatus of claim 25, wherein the graphics processor remains communication with memory and a display via a bus.

* * * * *